United States Patent [19]
Avital et al.

[11] 3,888,770
[45] June 10, 1975

[54] PLURAL-SAMPLE FILTER DEVICE

[76] Inventors: Shlomo Avital, 15 Bussel St., Rehovot; Menahem Silbermann, 78-Shikun Haamami, Ness-Ziona; David Elson, 9 Meonot Shine, Rehovot, all of Israel

[22] Filed: Oct. 21, 1971

[21] Appl. No.: 191,164

[52] U.S. Cl. .................... 210/238; 23/259; 23/292; 210/323; 210/474
[51] Int. Cl. ............................................ B01d 25/02
[58] Field of Search ............ 210/198 R, 198 C, 323, 210/445, 446, 447, 453, 238, 424; 23/259, 292

[56] References Cited
UNITED STATES PATENTS

| | | |
|---|---|---|
| 3,319,792 | 5/1967 | Leder et al. .................... 210/323 X |
| 3,757,952 | 9/1973 | Baitsholts et al. ................ 210/198 C |

*Primary Examiner*—Charles N. Hart
*Assistant Examiner*—Ivars Cintins

[57] ABSTRACT

A plural-sample filter device comprises a base plate, a filter plate, a cover plate, and a holding clamp for clamping the parts together with the filter plate interposed between the base and cover plates. The cover plate is formed with a plurality of openings for introducing the samples to be filtered, and the filter plate is provided with a corresponding plurality of aligned perforated areas each adapted to hold a filter disc. The base plate is formed with a plurality of receptacles aligned with the filteres, and is further formed with an outlet adapted to be connected to a pump, and a channel connecting the receptacles to the outlet.

1 Claim, 1 Drawing Figure

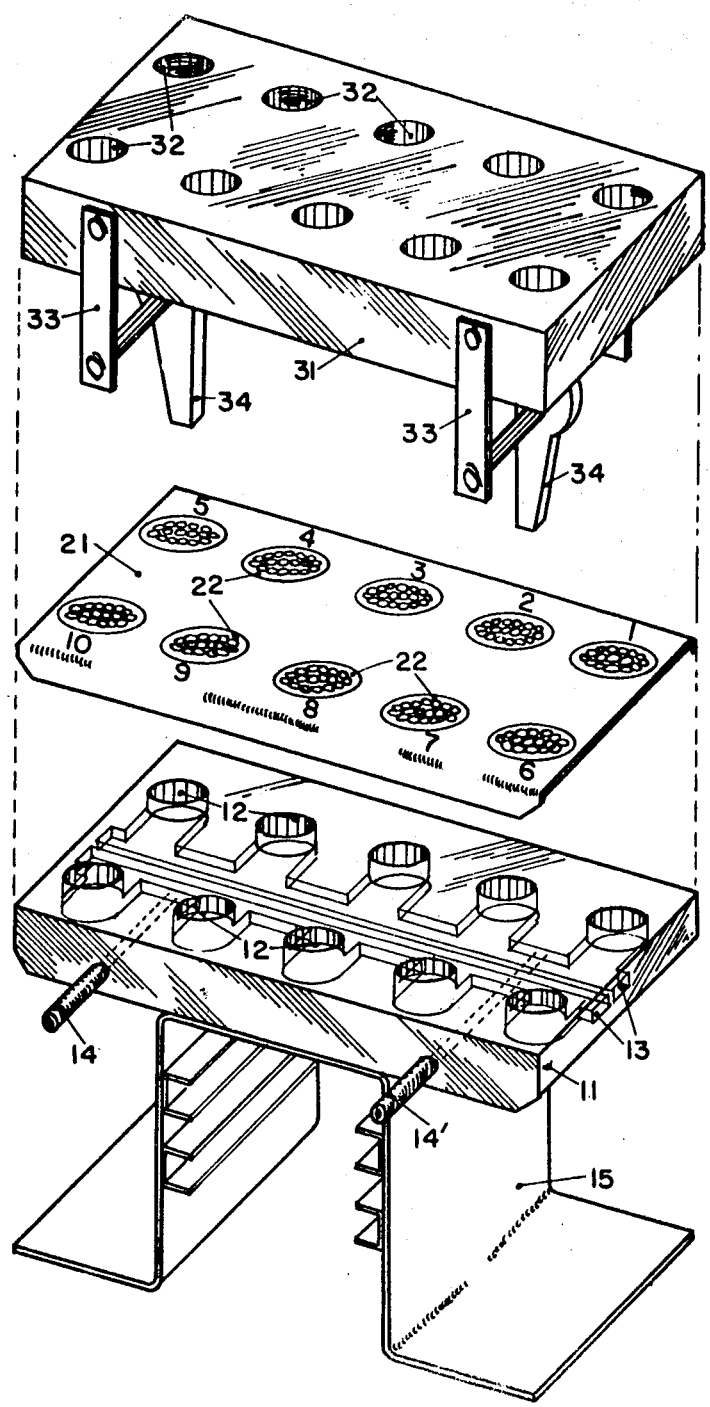

PLURAL-SAMPLE FILTER DEVICE

BACKGROUND TO THE INVENTION

The present invention relates to filter devices, particularly to those used for the rapid filtration through filter discs of a number of samples of liquids containing solid manner in suspension.

Among the advantages of the novel device over filters heretofore used, there may be mentioned the rapid processing of a large numbers of samples, the convenient removal of the filtrate (such as radioactive wastes), and the simplicity of construction and ease of control and operation.

The novel filter device may be used in almost any field of activity where it is desired to filter large numbers of samples. It is of special value for radioimmunological assays, amino acid transport, and incorporation studies of nucleic acids, proteins, and the like.

BRIEF SUMMARY OF THE INVENTION

The plural sample filter device constructed in accordance with the invention comprises a base plate, a filter disc, and a cover plate all firmly clamped together in superposed position with the filter plate interposed between the base plate and the cover plate. The cover plate is formed with a plurality of openings for introducing the samples to be filtered. The filter plate is provided with a corresponding plurality of aligned filter areas each adapted to receive a filter. The base plate is formed with a corresponding plurality of receptacles for receiving the filtered liquid, and with channels connecting the receptacles to the outlet. The outlet may be connected to a pump.

Further features of the invention will be apparent from the description below.

BRIEF DESCRIPTION OF THE DRAWINGS

The invention is herein described, by way of example only, with reference to the single FIGURE of drawings annexed hereto, which is an exploded perspective view of a preferred embodiment of plural-sample filter device constructed in accordance with the invention.

DESCRIPTION OF THE PREFERRED EMBODIMENT

The plural-sample filter device illustrated in the drawing comprises three main parts, namely a base plate or block 11, a filter plate 21, and a cover plate or block 31.

The base plate 11 is of rectangular shape and is formed with a plurality (10 being shown for purposes of example) of individual receptacles 12 all connected together by channels 13. The drawing illustrates the ten receptacles 12 arranged in two rows, and two channels 13 connecting the receptacles to two outlets 14, 14', each outlet carrying a tube for connection to a pump or other aspirator. Receptacles 12 may be provided by forming cylindrical recesses in the top face of base plate 11. If desired, these recesses may be inwardly tapered in the downward direction towards the connecting channels 13; and likewise the channels may be inwardly tapered in the downward direction.

Base plate 11 is preferably fixed to a mounting base 15 by any suitable means (not shown).

Filter plate 21 is also of rectangular shape and is positioned on top of base plate 11 so that the under-face of the filter plate is substantially flush with the upper-face of the base plate. Filter plate 21 is formed with ten perforated areas, numbered 1 – 10, each of which is adapted to receive an individual filter disc 22. The longer sides of filter plate 21 are bentover in the downward direction, as shown at 21', so as to partially overly the side faces of base plate 11. The bentover edges 21' of the filter plate enable the plate to serve as a stand when removed from the assembly, as described below. The perforated areas in filter plate 21 correspond in number and disposition with the receptacles 12 formed in base plate 11, and are aligned with these receptacles when the plates are assembled together.

The upper cover plate or block 31 is formed with openings 32 also corresponding in number and disposition to the perforated areas of filter plate 21, and to the receptacles 12 of base plate 11, and are aligned with them when the plates are assembled together. The samples to be filtered are introduced through the openings 32 in cover plate 31, and therefore these openings may be funnel-shaped, if desired. Cover plate 31 is also of the same rectangular shape as filter plate 21 and base plate 11, and its opposite ends each carry a pair of arms 33 pivotably mounted at their upper ends by means of pines 33', to the sides of the cover plate. The lower ends of arms 33 carry bars 36 extending across the bottom of the cover plate and spaced below it. Rotatably mounted on each bar 36 is an arm 34 formed with an eccentric cam face 35.

Before use, a filter disc 22 is placed on each of the perforated areas 1 – 10 of filter plate 21. The filter disc may be in the form of filter paper, a membrane filter, or the like. Filter plate 21 is then placed on top of base plate 11, and cover plate 31 is placed on top of the filter plate. Before applying the cover plate 31, its arms 33 are pivoted outwardly on pins 33' to the open or outward position of the bars, and after the cover plate is placed on top of the filter plate, the arms 33 are then pivoted downwardly to the closed or vertical position illustrated, whereupon the bars 36 enclose the base plate 11 and the filter plate 21. Arms 34 are then rotated so as to bring the eccentric cam faces 35 tightly against the underside of base plate 11, whereupon the parts are all firmly clamped together.

The device is used for processing a number of samples to be filtered, each sample being introduced through one of the openings 32. Outlet tubes 14, 14' are each connected to a pump or other asperating device to facilitate the filtration.

After the filtering process has been completed, the camped assembly is released by rotating arms 34 to their unlocking positions and then pivoting arms 33 to their open positions. Cover plate 31 is removed, and filter plate 21 may then be removed with the filtrates from the samples processed. The down-turned sides 21' of filter plate 21 permit the plate to be used as a stand, for example for drying or otherwise treating the removed filtrates. If radioactive material has been removed, filter plate 21 may be used as a stand for holding this material while its radioactivity is determined.

While filter plate 21 is used as a stand for further processing or examining the filtrate removed, another filter plate may be included in the assembly enabling the assembly to be used for filtering further samples.

Base plate 11 and cover plate 31 are preferably both made of rigid transparent plastic material such as methylmethacrylate resin; and filter plate 21 is preferably of stainless steel.

Many modifications, variations and other applications of the illustrated embodiment will be apparent.

What is claimed is:

1. A plural-sample filter device, comprising, a base plate; a filter plate; a cover plate; and means for holding said plates together in superposed position with the filter plate interposed between the base plate and the cover plate; said cover plate being provided with a plurality of individual openings for introducing therethrough the samples to be filtered; said filter plate being provided with a plurality of filter areas corresponding to the number of, and aligned with, the openings in said filter plate, each of said filter areas being adapted to receive a filter; said base plate being provided with a plurality of receptacles corresponding to the number of, and aligned with, the filter areas in said filter plate; said base plate also being formed with an outlet and channel means connecting said receptacles to said outlet, the said filter plate having downwardly bent sides enabling it to be used as a stand when removed from the device, the width of the unbent portion of the filter plate being substantially of the same length as the width of the base and cover plates.

* * * * *